UNITED STATES PATENT OFFICE.

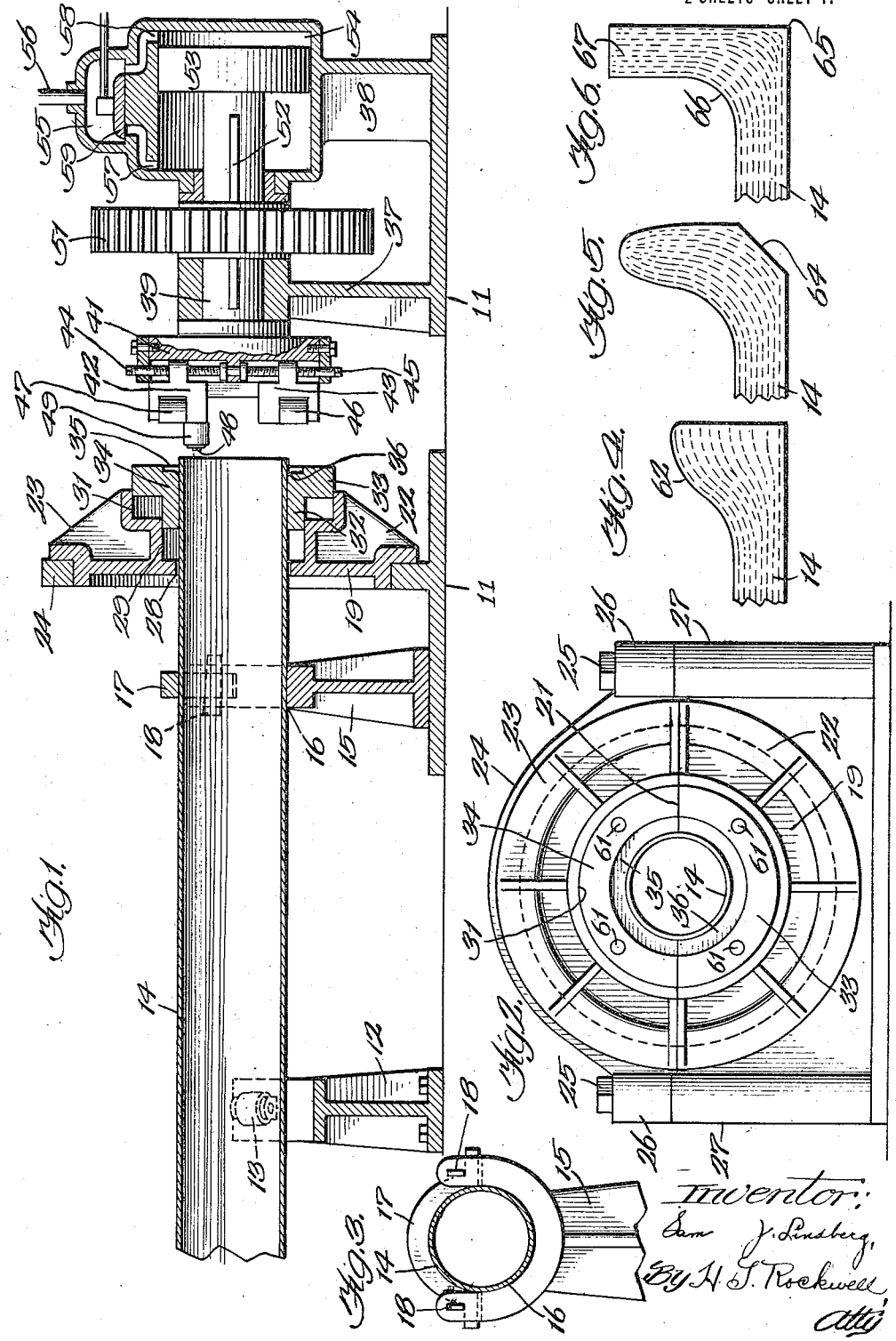

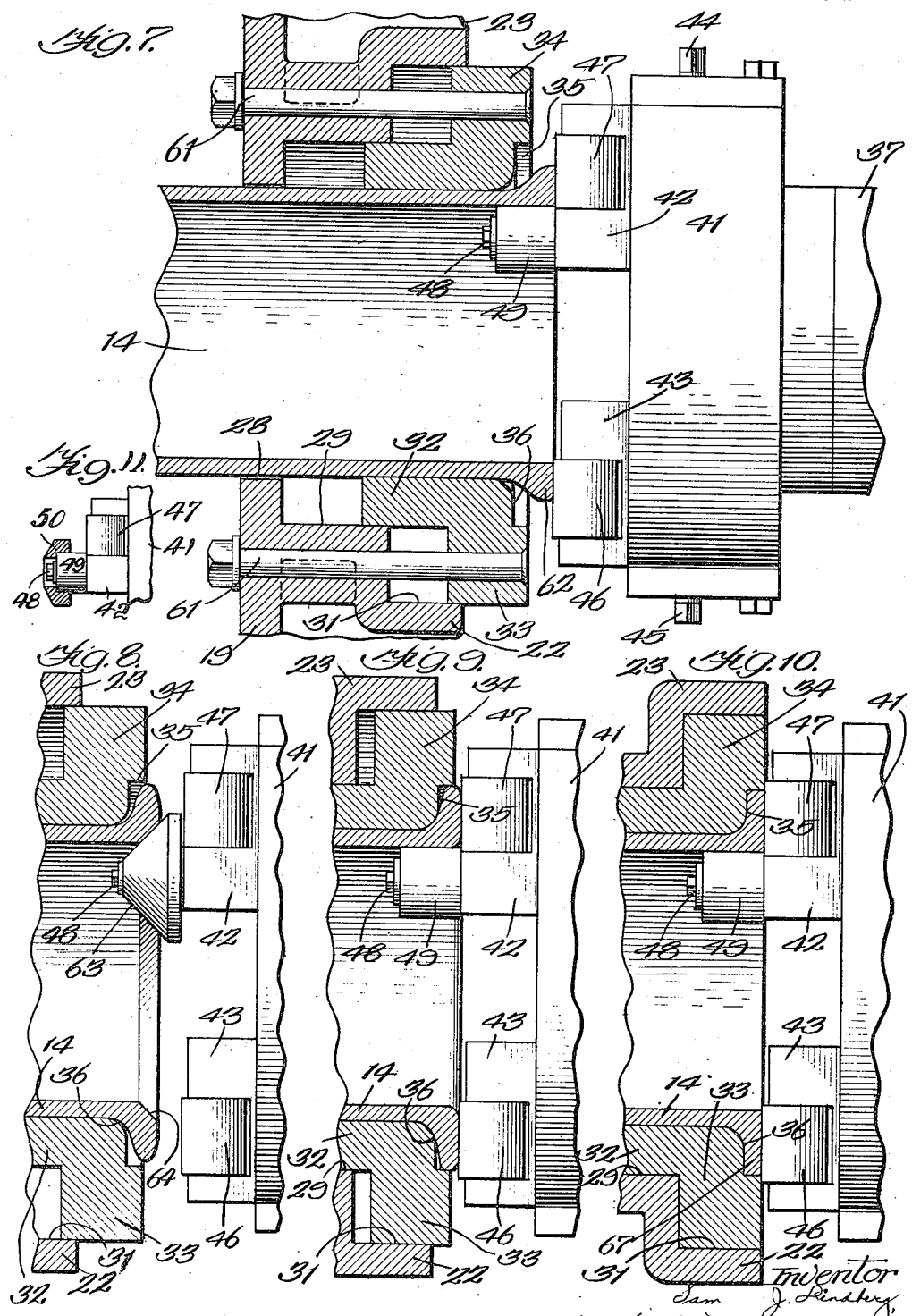

SAM J. LINDBERG, OF CHICAGO, ILLINOIS, ASSIGNOR TO CRANE COMPANY, OF CHICAGO, ILLINOIS, A CORPORATION OF ILLINOIS.

METHOD OF LAPPING METAL PIPES.

1,421,507. Specification of Letters Patent. Patented July 4, 1922.

Application filed June 21, 1920. Serial No. 390,428.

*To all whom it may concern:*

Be it known that I, SAM J. LINDBERG, a citizen of the United States, residing at Chicago, in the county of Cook and State of Illinois, have invented certain new and useful Improvements in Methods of Lapping Metal Pipes, of which the following is a specification.

This invention relates in general to the flanging or lapping of the ends of metal pipes and has more particular reference to a novel method of producing a lap flange on the end of a pipe.

It has heretofore been customary to form these lap flanges on the ends of ductile metal pipes by first bending outwardly, into a cone-like shape, the metal which forms the end portion of a pipe and then forcing this cone-shaped portion backwardly until it is disposed in a plane transverse to the longitudinal axis of the pipe. This practice, however, subjects the metal to excessive tension and bending strains and leaves the metal, at the bend, under tension which weakens the structure at the juncture of the flange and pipe proper. Furthermore, since the only metal available for forming the flange is in the wall of the pipe itself, it necessarily ensues that, when this metal is bent outwardly to form a flange having a circumference much larger than the circumference of the original pipe end, the metal must be stretched and consequently made thinner so that the flange produced is of diminishing thickness from its base toward its perimeter and is considerably thinner near its outer margin than the walls of the pipe itself. A flange thus produced is manifestly weaker than the pipe walls and its strength is further diminished by the machining or planing operation which is required to face the outer end surface of the flange in order to secure a tight joint.

Since the greatest strain on a flange of this character is imposed at the juncture of the flange and the pipe walls, it is obvious that this juncture should be reinforced, if possible, but with the method of forming the flanges above described, no metal in requisite quantities is available for providing a reinforcing fillet at this point and, on the contrary, the metal is weakened by the excessive bending and tension imposed thereon in forming the flange. Any break which occurs in a pipe line formed of flanged pipes of this character almost invariably occurs as the result of one or more of these weakened flanges giving way.

One of the primary objects of my present invention is to produce an integral lap flange on a ductile metal pipe which will possess the requisite strength and durability and will be as strong as the walls of the pipe itself. With this desideratum in view, I have devised a method by which a pipe can be provided with a flange in which the metal will not be under stress so as to weaken the structure, one in which the juncture between the flange and the pipe proper will be reinforced with a fillet of sufficient thickness to provide a juncture which is stronger instead of weaker than the pipe walls, and one which, instead of being thinner than the pipe walls, may be at least as thick as these walls and which may if desired be of substantially uniform thickness from its base to its perimeter; thus possessing strength and durability heretofore unattainable in lap flanged pipes of this general character. in fact, by using dies of different shapes, flanges having parallel, converging, or even diverging faces, may be produced.

Another object of my invention is to provide a flange which will have a relatively smooth and circular perimeter instead of a rough irregular perimeter, such as has heretofore been produced by the methods employed, so that by my method the turning operation, heretofore required to smooth and render circular the perimeter of the flange, is obviated.

Still another object of my invention is the provision of a method by which a pipe may be equipped with a flange possessing all of the desirable characteristics above mentioned and also by which a right angled corner between the inner wall of the pipe and the outer face of the flange may be secured so that no grooves or pockets around the bore of the pipe line will be produced when two of these flanged ends are connected together but, on the contrary, a continuous bore of uniform diameter will be attained at the joints as well as throughout the pipe lengths of the line.

Other objects and many of the attendant advantages of my invention should be readily appreciated as the same becomes better understood by reference to the following description when considered in connection with the accompanying drawings in which is illustrated one practical and preferred machine by which my improved method may be carried out.

Referring to the drawings,

Fig. 1 is a sectional side elevation of a machine for carrying out my improved method;

Fig. 2 is an end view of the die and pipe holder surrounding the end of the pipe which is being operated upon;

Fig. 3 is a fragmentary end view of the standard or bracket in which the pipe is carried;

Fig. 4 is a fragmentary sectional view of the end portion of a pipe after it has been subjected to the upsetting operation;

Fig. 5 is a similar view after the flaring operation;

Fig. 6 is a similar view of a completed flange;

Fig. 7 is a fragmentary plan view showing the manner of performing the upsetting operation;

Fig. 8 is a similar view illustrating the flaring operation;

Fig. 9 is a similar view showing the compression operation;

Fig. 10 is a similar view showing the completion of the flange; and

Fig. 11 is a fragmentary view of an alternative form of conical roller.

In carrying out my improved method, the mode of operation, briefly stated, consists first in providing an excess of metal at the end of the pipe. This is done by upsetting the metal of this end portion so as to dispose the excess metal upon the outside rather than the inside of the pipe, the upsetting being accomplished by exerting a longitudinal pressure upon the end of the pipe and at the same time preventing inward movement of the upset metal beyond the plane of the inner face of the pipe wall. After the upsetting operation, the thickened end portion of the pipe is flared outwardly by subjecting the same to a pressure exerted at an angle to the longitudinal axis of the pipe. After the flaring operation, the flared portion of the pipe is compressed against a die so that the metal is forced inwardly to produce a right angled corner between the inner wall of the pipe and the outer face of the completed flange, and at the same time, the flange is made truly circular in contour and, if desired, of uniform thickness from its base to its perimeter and is reinforced on the outside of the pipe at the juncture between the pipe and flange by a fillet of substantial thickness.

Referring now more in detail to the drawings of a machine by which my improved method may be carried out. reference character 11 designates, generally, the base of the machine upon which the various parts are carried. Extending upwardly from this base or mounted independently thereof, is a pipe rest 12 equipped with a pair of rollers 13 upon which the pipe 14 rests so that it may be moved longitudinally along the frame as required.

Another pipe supporting bracket 15, spaced from the pipe rest 12, is shaped to provide a saddle 16 adapted to accommodate and support the pipe 14, an upper clamping member or yoke 17 being adapted to overlie the pipe and be fastened to the saddle 16 by tapered keys 18 which afford provision for clamping the pipe between the saddle and yoke so as to hold it against movement during the flanging operation.

Forwardly of the bracket 15 there is mounted a die head 19 split horizontally along the line 21 so as to provide lower and upper halves 22 and 23, respectively, adapted to be clamped together by a strap or yoke 24 overlying the upper half of the head and adapted to be drawn downwardly by means of bolts 25 passing through eyes 26 and threaded into posts 27 at the sides of the lower head member 22.

This head is provided with a central aperture 28 adapted to accommodate the pipe 14 and forwardly of this aperture, the head is formed to provide annular guiding recesses 29 and 31, respectively, of different diameters adapted to accommodate, with a sliding fit, shank 32 and head 33 of a two-piece die designated generally, by reference character 34.

This die is provided with a central bore adapted to snugly but slidably fit the pipe 14, and on its forward face, it is provided with an annular depression 35 surrounding the bore and extending radially therefrom a distance equal to the width of the flange to be produced, the recess being merged into the bore along a curved surface 36 designed to produce the desired shape of fillet to unite the flange with the outer wall of the pipe as will be later explained. The depth of the recess 35, inwardly from the outer face of the die, is determined by the thickness of the flange desired to be produced by the die.

Forwardly of the die head there is mounted in suitable bearings upon standards 37 and 38, a shaft 39 carrying at is rear end a rotating head 41 in which are adjustably mounted a pair of blocks 42 and 43, respectively, these blocks being adjustable toward and from each other by an oppositely threaded adjusting screw having squared ends 44 and 45 respectively, to accommodate the head to pipes of various sizes. Block 43 carries a facing roller 46 disposed at right angles to the axis of rotation of the head and block 42 carries a similar roller 47 and in addition thereto it is provided adjacent the inner end of roller 47 with a longitudinally extending bearing spindle 48 upon which is rotatably mounted an inner roller 49. These blocks with the rollers carried thereby are so adjusted that the roller 49 will contact with the inner wall of the pipe to be operated upon, while the face rollers 46 and 47 will be disposed in longitudinal alinement with the walls of the pipe.

The head 41 with the operating rollers carried thereby is rotated by any suitable means, a gear wheel 51 being shown in the present instance as splined by key-way 52 to the shaft 39 so that upon rotation of the gear wheel from any suitable gear (not shown), the shaft will be rotated. For the purpose of moving the operating rollers toward or from the die head, I have shown, for purposes of illustration merely, a piston 53 rotatably attached to the forward end of shaft 39 and adapted to reciprocate in a cylinder chamber 54. The piston may be actuated to reciprocate the head 41 by hydraulic, air or steam pressure as preferred, which may be introduced into a chest 55 through a supply pipe 56, the flow to opposite sides of the piston through the ports 57 and 58 being controlled by a slide valve 59 of suitable construction operable in any preferred manner.

The method of operation is substantially as follows:—

A pipe 14 to be operated upon is positioned as shown in Fig. 1 where it is held against movement by the clamping action of the saddle 16 and yoke 17, the end being projected through the die head into the position shown and the die 34 being slipped over the end of the pipe into the position shown. The rollers 46, 47 and 49 are then moved into operative relation with the pipe end, roller 49 being disposed within the pipe and rollers 46 and 47 against the end of the pipe. If the pipe is of wrought metal such as is customary in pipe construction, the end to be operated upon will have been previously heated before the pipe is positioned in the machine, but if the pipe is made of brass or other soft metal, the preliminary heating is unnecessary. The head 41 and the rollers are now revolved by the gear 51 and continued pressure is exerted upon the forward face of the piston 53 to force the rollers 46 and 47 with strong pressure against the end of the pipe. The pressure of these rollers will cause the metal constituting the end portion of the pipe to be upset, thus thickening the pipe walls at the end thereof but, since the roller 49 travels within the pipe and in contact with the inner wall thereof, inward movement of the metal is precluded and the original diameter of the pipe is accordingly maintained while the upset metal accumulates in a ring or flange on the outside of the pipe as will be apparent from Fig. 7.

It will be observed at this point that the die 34 snugly embraces the perimeter of the pipe adjacent its end surface to preclude buckling of the pipe during this upsetting operation. From Fig. 7, it will be observed that the die is slidingly connected to the head by a series of bolts 61 which limit the forward movement of the die but permit the die to slide rearwardly when pressure is exerted upon its forward face as will be later explained.

The thickening of the wall of the pipe at its ends by the upsetting operation just explained, provides an available surplus of metal at this point which is utilized in forming a flange of the desired thickness, shape and strength. The thickened upset portion of the pipe is indicated on the drawings by reference character 62 and the approximate disposition of the grains of the metal in this upset portion is illustrated in Fig. 4. The length of the upset is determined by the position of the die 34.

After the upsetting operation has been performed the head 41 is retracted to withdraw the rollers from operative relation to the pipe whereupon the roller 49 is replaced by frustoconical-shaped roller 63 best shown in Fig. 8. While the roller 49 may be entirely removed and replaced by this conical roller, I have found that in practice it is preferable to employ a conical roller 50 which can be simply slipped over the roller 49 without removing this roller from its spindle, as shown in Fig. 11. The head 41 is now moved under pressure toward the pipe again, bringing the roller 63 into engagement with the thickened end of the pipe and, upon continued application of pressure and continued rotation of the head, the metal of the pipe is flared outwardly by the roller from the position shown in Figs. 4 and 7 until it assumes the position shown in Figs. 5 and 8. It will be observed that in this operation the flaring begins on the outside of the pipe at the base of the curve 36 of the die 34 while on the inside of the pipe, the flare conforms to the shape of the roller 63 and presents a substantially straight line face as indicated by reference character 64 in Fig. 5. It will be observed that the general direction of the application of pressure during this operation is at an angle to the longitudinal axis of the pipe with the result that the thickened upset pipe end is forced outwardly into a rough semblance of a flange, without any sharp bending of the metal such as would impose undue stresses or strains thereon.

After the flaring operation, the head 41 is again retracted and the roller 63 is replaced by the straight roller 49 whereupon the head is again projected toward the pipe to bring the face rollers 46 and 47 into operative relation with the flared pipe end. The pressure of these rollers first forces the flared end backwardly against the face of the die and, as the pressure continues, the die is gradually forced rearwardly in the head until it finally becomes solidly seated against the bottoms of the recesses 29 and 31. The action of the rollers upon the pipe, before the operation is completed, is shown in Fig. 9 wherein it will be observed that the die 34 has been moved rearwardly from the position that it assumed in Figs. 7 and 8 and that the flared end produced by the previous operation has been somewhat flattened out and partially compressed into the recesses 35 of the die.

When the die has been pushed fully into its seat so that no further sliding movement along the pipe is possible, the continued pressure exerted by the rollers 46 and 47 compresses the roughly shaped flange, resulting from the flaring operation, into the recess of the die until it completely fills the same, the metal being worked outwardly into the outer corners of the recess producing a smooth circular circumference to the flange and also inwardly into the rectangular corner between the rollers 47 and 49 so that a right angled corner is produced joining the inner wall of the pipe and the outer face of the flange. This square corner is indicated in Fig. 6 by reference character 65 and, as will be obvious from the manner in which this corner is produced and from the position of the grain of the metal in the completed structure, the metal is not under stress or tension such as would detract from its strength but, on the contrary, remains in normal condition retaining its full strength and elasticity.

The position of the parts at the completion of the last operation is shown in Fig. 10 from which it will be observed that the recess in the die face is completly filled by the metal forming the completed flange, with the result that a flange of uniform thickness in the present instance from its base to its perimeter is produced which is joined to the pipe walls by metal not under stress and which retains its original strength and resiliency; and it should be further noted that the juncture between the flange and the pipe wall, instead of being weakened by the lapping operation, possesses additional strength as the result of the formation of the rectangular corner 65 and the reinforcing fillet 66 between the outer face of the pipe and the adjacent face of the flange.

The completed flange, indicated generally by reference character 67, resulting from my improved method, possesses the desirable characteristics of strength and durability resulting from the fact that the flange is as thick as the pipe walls even at its perimeter and may be of uniform thickness throughout its depth, and furthermore, is reinforced by the fillet 66 and strengthened by the sharp corner 65 all of which are formed without placing the metal under undesirable tension and, in addition, the completed flange presents a right angled corner between the inner face of the pipe and the outer face of the flange and also presents a circular contour which does not need to be machined in order to obtain the requisite shape.

It is believed that my improved method, the advantageous results accruing therefrom, and one form of apparatus for carrying my method into effect, will be understood from the foregoing without further description, but it should be manifest that my method is capable of considerable modification and variation from the specific illustration thereof herein disclosed without departing from the essence of the invention as defined in the appended claims.

I claim—

1. The method of lapping pipes, which consists in exerting a pressure against the end of a pipe to upset and thicken the walls thereof, embracing the pipe near said end to limit the length of the upset, exerting a pressure radially and longitudinally against said thickened walls to displace the metal thereof, and first yieldably and then positively opposing the movement of the metal under the action of said pressure to thereby cause the metal to flow into the required flange form.

2. The method of lapping pipes, which consists in embracing a pipe near an end thereof, upsetting the projecting unembraced portion to increase the thickness of its walls, forcing the metal of said thickened portion radially outwardly and also longitudinally backwardly of the pipe, exerting initially a yielding resistance to such movement, and finally exerting a positive resistance to such movement to thereby force the metal under pressure into flange form.

3. The method of lapping pipes which consists in upsetting the metal of the pipe at one end thereof, to thicken the walls, limiting the length of the upset, exerting pressure upon the thickened walls to displace the metal thereof, yieldably opposing the movement of the metal backwardly along the pipe until a flange is roughly formed, and then positively opposing such movement to compress said metal into a finished flange.

4. The method of lapping pipes which consists in upsetting an end portion of the pipe to thicken the walls thereof, embracing the pipe at a predetermined distance from its end to thereby limit the length of the upset, exerting pressure radially and longitudinally of the pipe upon said upset portion to displace the metal thereof, causing the embracing element to retreat along the pipe under the action of the metal being displaced, and finally stopping the retreating movement of said element so that the metal is compressed against said element into a finished flange of substantially uniform thickness having a circular perimeter and having a right angle juncture with the interior of the pipe.

5. The method of lapping pipes, which consists in upsetting the metal at one end of the pipe to thicken the walls thereof, displacing the metal of said thickened walls outwardly and backwardly along the pipe, and opposing the backward movement of the metal during the entire displacement whereby to cause said metal to flow into flange form.

6. The method of lapping pipes, which consists in providing an excess of metal in the end of the pipe to be lapped, displacing said metal outwardly and backwardly along the pipe, and providing a retreating opposition during the initial displacement and a positive opposition during the final displacement of the metal to thereby cause a flow of the metal particles into finished flange form so that said particles are under minimum stress in the finished flange.

7. The method of lapping pipes, which consists in providing a surplus of metal at an end of the pipe by upsetting the metal in the walls thereof, displacing said metal longitudinally and radially of the pipe, yieldingly opposing such longitudinal displacement to thereby increase the radial displacement, and finally positively limiting both longitudinal and radial displacement of the metal to produce a finished flange having a truly circular perimeter of predetermined thickness.

8. The method of lapping pipes, which includes thickening the walls of the pipe at the end to be flanged, displacing the metal of said thickened walls radially and longitudinally of the pipe, and offering retreating opposition to the movement of said metal to thereby cause said metal to flow into the desired flange form.

9. The method of lapping pipes, which includes providing an excess of metal in the pipe walls at the end to be lapped, forcing the metal at the aforesaid end of the pipe outwardly and backwardly along the pipe, and yieldably resisting movement of said metal.

10. The method of lapping pipes, which includes thickening the walls of the pipe at the end to be flanged, displacing the metal of said thickened walls radially and longitudinally of the pipe, and yieldably opposing the displacement of said metal longitudinally of the pipe.

11. The method of lapping pipes, which includes thickening the walls of the pipe at the end to be flanged, displacing the metal of said thickened walls radially and longitudinally of the pipe, yieldably opposing the displacement of said metal and finally positively resisting further displacement of said metal longitudinally of the pipe.

12. The method of lapping pipes, which includes thickening the walls of the pipe at the end to be flanged, exerting a longitudinal and radial pressure upon said thickened walls, and exerting a retreating opposing longitudinal pressure against the metal being displaced whereby to cause said metal to flow into the required flange form.

SAM J. LINDBERG.